(12) United States Patent
Ruby, III et al.

(10) Patent No.: US 8,342,593 B2
(45) Date of Patent: Jan. 1, 2013

(54) ANTI-EXTREMITY PINCH GARNISH

(75) Inventors: Joseph P. Ruby, III, Marysville, OH (US); Michael E. Franz, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 460 days.

(21) Appl. No.: 12/624,985

(22) Filed: Nov. 24, 2009

(65) Prior Publication Data

US 2011/0121605 A1 May 26, 2011

(51) Int. Cl.
*B62D 25/10* (2006.01)

(52) U.S. Cl. ........ 296/152; 296/76; 296/1.04; 296/1.08; 49/383

(58) Field of Classification Search ............... 296/146.1, 296/152, 146.9, 76, 1.04, 1.08, 1.07, 193.11; 180/69.21; 49/383
See application file for complete search history.

(56) References Cited

U.S. PATENT DOCUMENTS

| | | | |
|---|---|---|---|
| 1,444,398 A * | 2/1923 | Shepherd | 296/63 |
| 1,444,994 A * | 2/1923 | White | 49/383 |
| 1,626,844 A * | 5/1927 | Kuhn | 160/229.1 |
| 1,894,102 A * | 1/1933 | Kuenzel | 49/383 |
| 2,622,286 A | 12/1952 | Beck | |
| 2,647,792 A | 8/1953 | Flemming | |
| 4,804,223 A * | 2/1989 | Iati | 296/152 |
| 4,958,883 A * | 9/1990 | Iwaki et al. | 296/152 |
| 5,010,691 A | 4/1991 | Takahashi | |
| 5,347,759 A | 9/1994 | Kobayashi et al. | |
| 5,570,925 A * | 11/1996 | Cohen | 296/177 |
| 5,664,822 A * | 9/1997 | Rosenfield | 296/39.2 |
| 6,453,511 B2 * | 9/2002 | Sato | 16/360 |
| 6,772,561 B1 | 8/2004 | Berger, Jr. | |
| 7,320,496 B2 | 1/2008 | Griffis et al. | |
| 2010/0176609 A1 * | 7/2010 | Gill | 293/120 |

* cited by examiner

*Primary Examiner* — Jason S Morrow (74) *Attorney, Agent, or Firm* — Rankin Hill & Clark LLP (57) ABSTRACT

An anti-extremity pinch garnish for preventing pinching of extremities between a hinged edge portion of a vehicle closure and an adjacent portion of a vehicle body to which the vehicle closure is pivotally mounted includes a first portion secured to the vehicle body adjacent an opening defined therein and a second portion integral with said first portion and configured to obstruct entry of an extremity between the hinged edge portion of the closure and the adjacent portion of the vehicle body.

18 Claims, 6 Drawing Sheets

ANTI-EXTREMITY PINCH GARNISH

BACKGROUND

The present disclosure generally relates to a safety device for a vehicle, and particularly relates to an anti-extremity pinch garnish for preventing pinching of extremities between a hinged edge portion of a vehicle closure and an adjacent portion of a vehicle body to which the vehicle closure is pivotally secured.

Figure 6:
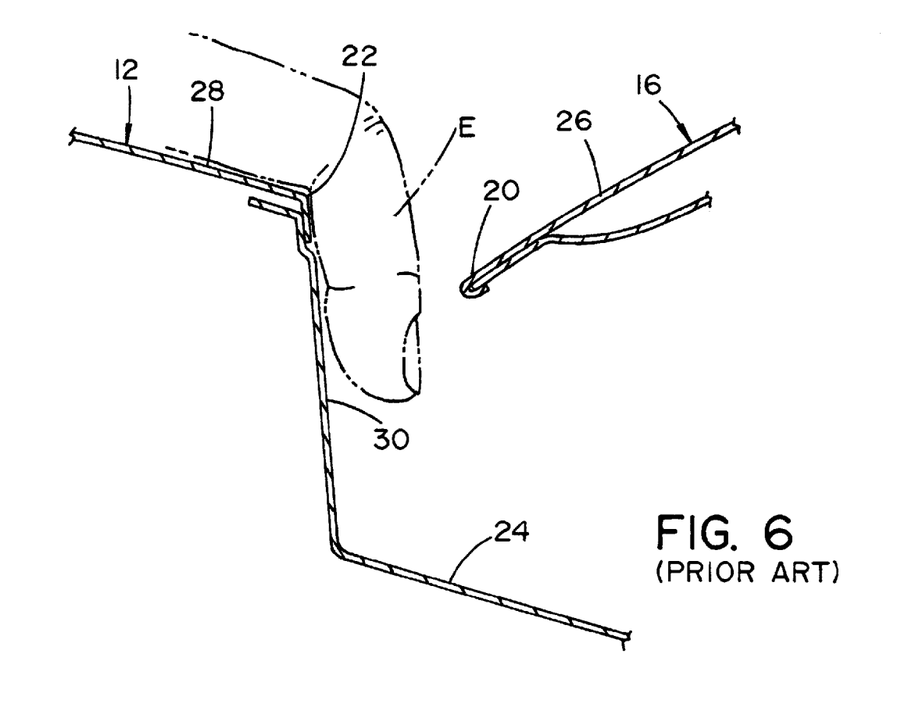
FIG. 6 is a cross-sectional view of a vehicle closure assembly lacking an anti-extremity pinch garnish.
Figure 7:
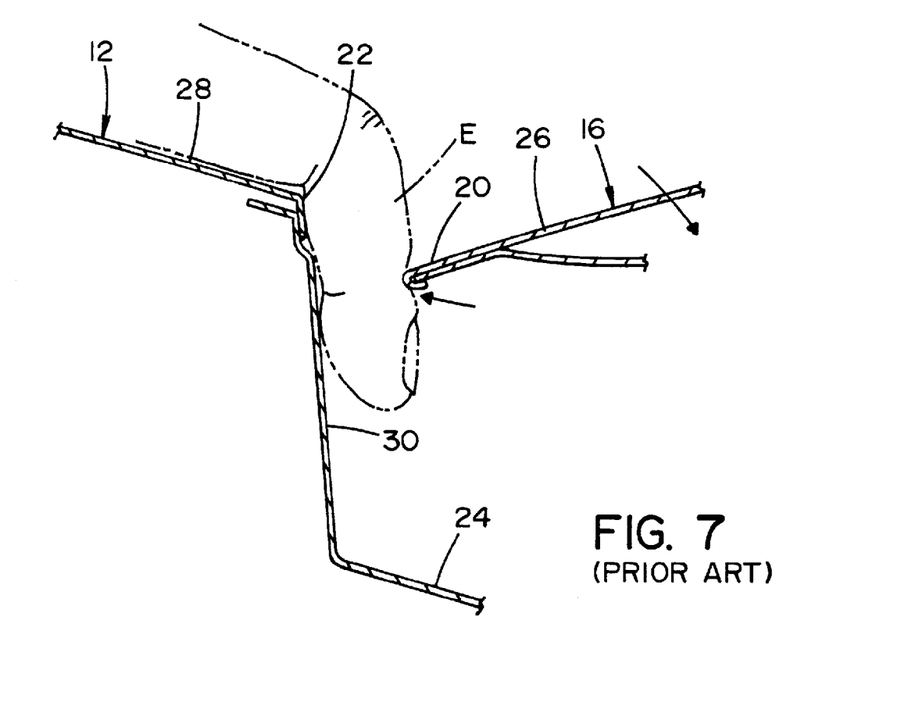
FIG. 7 is a cross-sectional view similar to FIG. 6 showing the closure moving toward its closed position and pinching the extremity between a hinged edge of the closure and an adjacent portion of the vehicle body.

Referring to FIGS. 6 and 7, conventional hinged vehicle closures, when opened, sometimes allow fingers or other extremities to fit between the closure and the vehicle body, particularly between a hinged edge portion of the closure and an adjacent portion of the vehicle body. More specifically, when a vehicle closure (e.g., a tailgate, trunk lid, door, etc.) is in its closed position, a gap between the hinged edge portion of the closure and the adjacent vehicle body is sufficiently small to prevent any extremities from normally fitting between the hinged edge portion and the adjacent portion of the vehicle body. However, when the vehicle closure is moved toward or to its opened position, the gap between the hinged edge portion and the adjacent portion of the vehicle body increases in size and can be wide enough to allow a finger or other extremity to be inserted between the hinged edge portion and the adjacent portion of the vehicle body. Should the closure be moved toward or to its closed position without the finger or other extremity being removed, the hinged edge portion can pinch the finger or other extremity and potentially cause injury.

SUMMARY

According to one aspect, an anti-extremity pinch garnish is provided for preventing pinching of extremities between a hinged edge portion of a vehicle closure and an adjacent portion of a vehicle body to which the vehicle closure is pivotally mounted. The closure can selectively close an opening defined in the vehicle body. In accordance with this aspect, the anti-extremity pinch garnish includes a first portion secured to the vehicle body adjacent the opening defined therein and a second portion integral with the first portion and configured to obstruct entry of an extremity between the hinged edge portion of the closure and the adjacent portion of the vehicle body.

According to another aspect, a vehicle closure assembly for preventing pinching of extremities includes a vehicle body defining an opening therein and a closure hingedly connected to the vehicle body for selectively closing the opening. A garnish member is secured to the vehicle body to limit insertion of an extremity between a hinged edge of the closure and an adjacent portion of the vehicle body.

According to still another aspect, an anti-pinch garnish assembly for a vehicle includes a garnish member having a first portion fastened to a recessed area of a vehicle body. The recessed area defines an opening and accommodates a closure that is hingedly mounted to the vehicle body and is capable of closing the opening when in a closed position. The closure is received in the recessed area so as to be flushly positioned relative to a show surface of the vehicle body when in the closed position. The garnish member has a second portion integrally formed with the first portion and extending therefrom so as to obstruct insertion of an extremity between a hinged edge portion of the closure and the show surface of the vehicle body.

DETAILED DESCRIPTION

Figure 1:
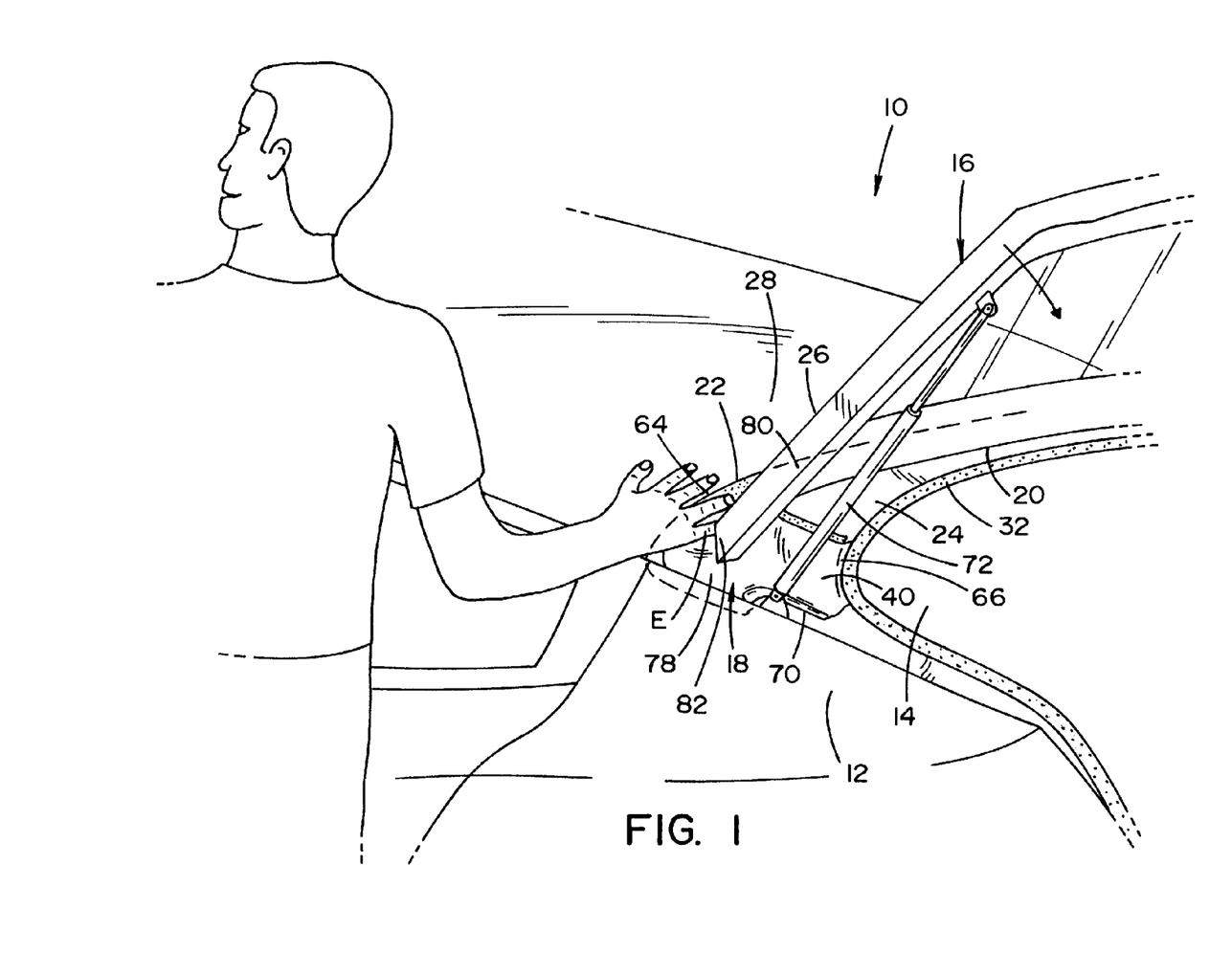
FIG. 1 is a partial perspective view of a vehicle closure assembly having an anti-extremity pinch garnish for preventing pinching of extremities.

Referring now to the drawings, wherein the showings are for purposes illustrative of one or more exemplary embodiments and not for purposes of limiting same, FIG. 1 illustrates a vehicle closure assembly 10 for preventing pinching of extremities (e.g., illustrated extremity E). The illustrated vehicle closure assembly 10 includes a vehicle body 12 defining an opening 14 therein and a closure 16 hingedly connected to the vehicle body 12 for selectively closing the opening. An anti-extremity pinch garnish or garnish member 18 is secured to the vehicle body 12 for preventing pinching of extremities (e.g., fingers and other extremities) between a hinged edge or hinged edge portion 20 of the vehicle closure 16 and an adjacent portion 22 of the vehicle body 12 to which the vehicle closure 16 is pivotally mounted.

Figure 3:
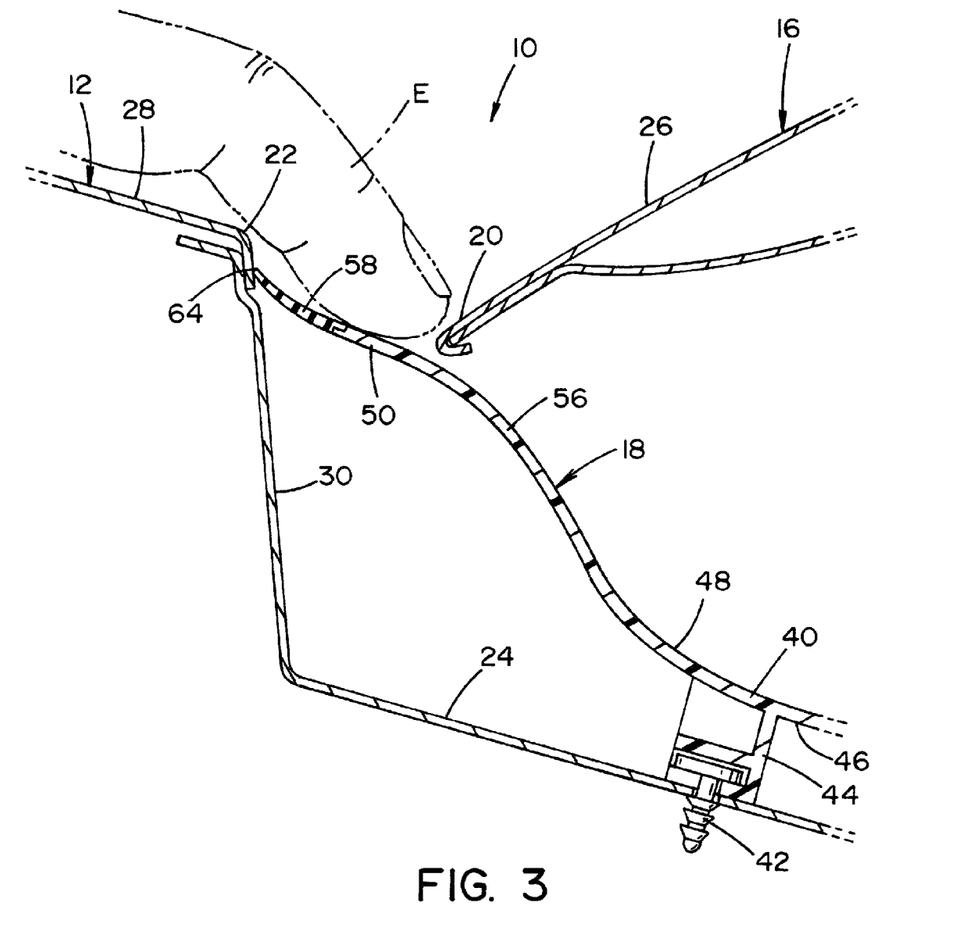
FIG. 3 is a partial cross-sectional view of the vehicle closure assembly shown with a closure thereof in an open position and the pinch garnish preventing insertion of an extremity between a hinged edge of the closure and an adjacent portion of the vehicle body.

A recessed area 24 is defined around the opening 14. The recessed area 24 defines the opening 14 and, as will be described in more detail below, accommodates the closure 16 that is hingedly mounted to the vehicle body 12 and capable of closing the opening 14 when in the closed position. In particular, the closure 16 can be received in the recessed area 24 so as to be flushly positioned, or at least a show surface 26 of the closure can be flushly positioned, relative to a show surface 28 of the vehicle body 12 when the closure 16 is in the closed position. In the illustrated embodiment, a sidewall 30 (FIGS. 3-4) extends upward from the recessed area 24 and the show surface 28 is offset relative to the recessed area 24 and connected thereto by the sidewall 30. The recessed area 24 can include a seal 32 mounted around the opening 14 that seals against the closure 16 when it is in its closed position.

The garnish member 18 is secured to the recessed area 24 to limit insertion of an extremity between the hinged edge portion 20 of the closure 16 and the adjacent portion 22 of the vehicle body 12. The garnish member 18 has a first portion 40 secured to the vehicle body 12 adjacent the opening 14 defined therein. More particularly, in the illustrated embodiment, the first portion 40 of the garnish member 18 is fastened via fastener 42 to the recessed area 24 of the vehicle body 12. The illustrated garnish member 18 particularly includes a fastener structure 44 depending from an underside 46 of the first portion for accommodating the fastener 42 that secures the garnish member 18, and particularly the first portion 40, to the vehicle body 12 without being viewable on a show surface 48 of the garnish member 18. It is to be appreciated by those skilled in the art that other means and/or devices could be used to secure the garnish member 18 to the vehicle body 12. For example, a threaded fastener could secure the garnish member, a fastener could be received through a simple aperture without use of the underside fastener structure 44, etc.

The garnish member 18 additionally has a second portion 50 that is integral with and integrally formed with the first portion 40 and is configured to obstruct entry of an extremity E between the hinged edge portion 20 of the closure 16 and the adjacent portion 22 of the vehicle body 12. In the illustrated embodiment, the second portion 50 extends from the first portion 40 so as to obstruct insertion of an extremity E between the hinged edge portion 20 of the closure 16 and the show surface 28 of the vehicle body 12. According to this arrangement, the first portion 40 can be mounted against or adjacent the recessed area 24 of the vehicle body 12, whereas the second portion 50 slopes upwardly from the first portion 40 toward the show surface 28 of the vehicle body 12.

Figure 2:
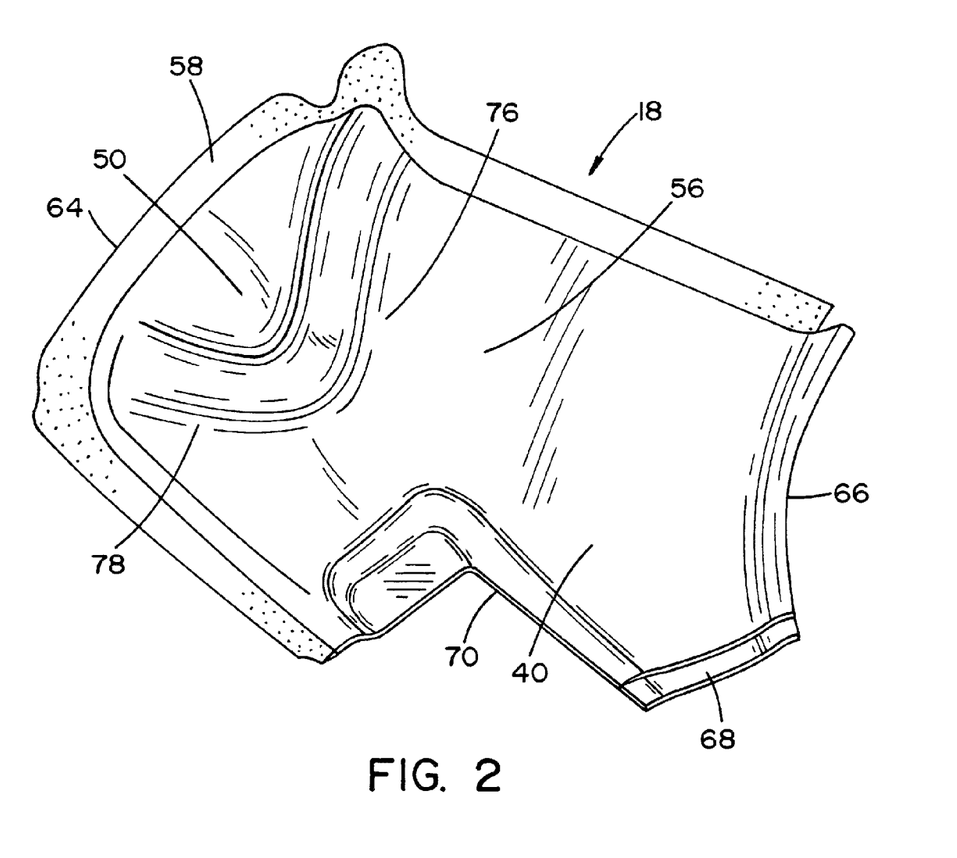
FIG. 2 is a perspective view of the anti-extremity pinch garnish shown removed from the vehicle closure assembly of FIG. 1.

As best shown in FIG. 2, the pinch garnish member 18 can include an inner portion 56 formed of a first material and a second peripheral edge portion 58 formed of a second material. The first material of the inner portion 56 can be more rigid than the second material of the second portion 58. That is, the garnish member 18 can include inner rigid portion 56 and outer less rigid portion 58. In the illustrative embodiment, the second peripheral edge portion 58 is provided generally along three sides of the garnish member 18. In particular, the second material of the second peripheral edge portion 58 can be a generally flexible, resilient material that is adapted to be moved by the closure 16 when it is moved toward its closed position to avoid being pinched between the closure 16 and the vehicle body 12. By way of example only, the inner portion 56 can be formed of polypropylene and the outer peripheral edge portion 58 can be formed of a thermoplastic, though this is not required. Advantageously, with reference to FIG. 3, the outer peripheral edge portion 58, which is primarily provided about the second portion 50 and is formed of a more flexible material, can mate with the sidewall 30 of the vehicle body 12 that extends from the vehicle body show surface 28 to the recessed area 24.

As already described, the first portion 40 of the garnish member 18 is received in the recessed area 24 of the vehicle body 12 that surrounds the opening 14 and accommodates the closure 16 when in its closed position, in part because the second portion 50 is raised relative to the first portion 40 and the recessed area 24. With continued reference to FIG. 3, the second portion 50 generally bridges between the hinged edge portion 20 of the closure 16 and the show surface 28 of the vehicle body 12 (i.e., the surface that is generally co-planer with the closure 16, and particularly the show surface 26 thereof, when the closure is in its closed position). In the illustrated embodiment, the outer peripheral edge 58, particularly the portion thereof adjacent the portion 22 of the vehicle body 12, is sloped upward toward the show surface 28 to guide away an extremity E interposed between the hinged edge portion 20 and the sidewall 30 as the closure 16 is closed.

Figure 4:
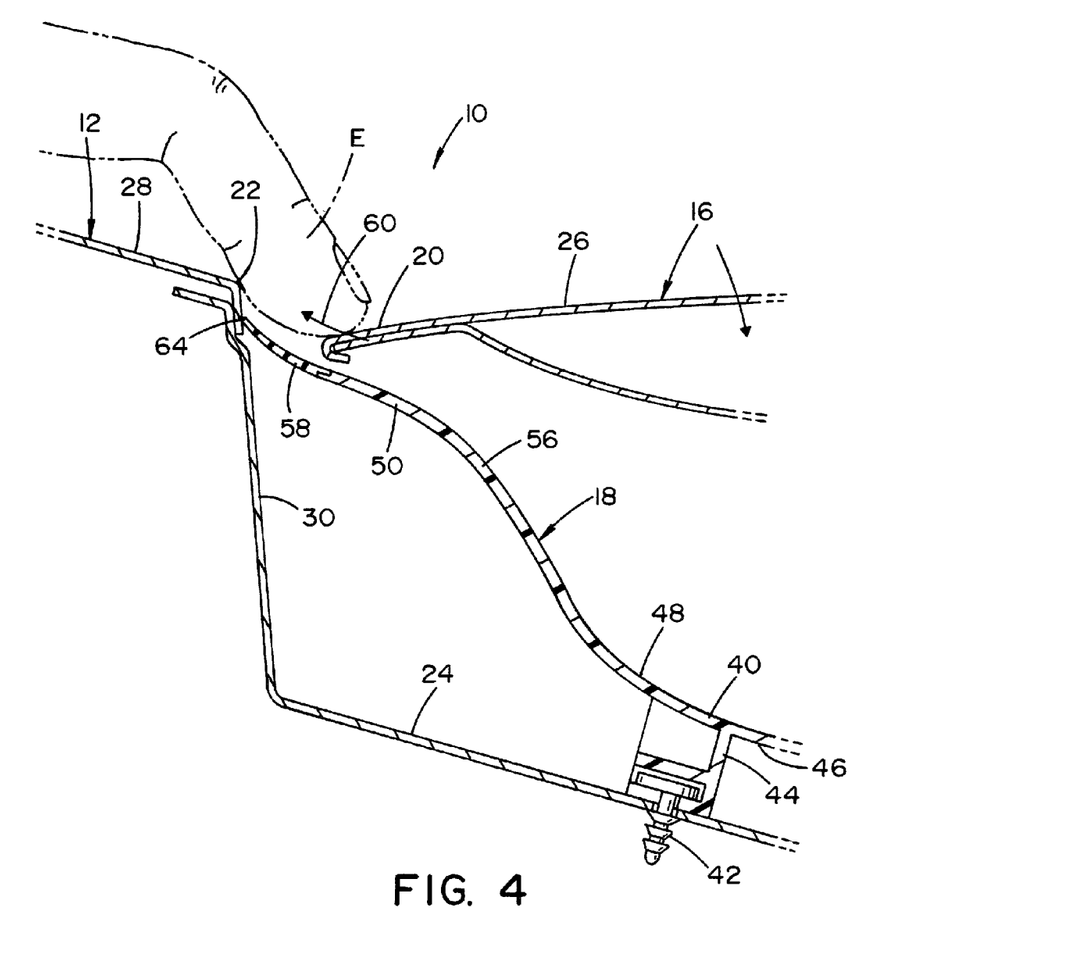
FIG. 4 is a cross-sectional view similar to FIG. 3 showing the closure moving toward its closed position and, in conjunction with the pinch garnish, moving the extremity away from a pinched condition.
Figure 5:
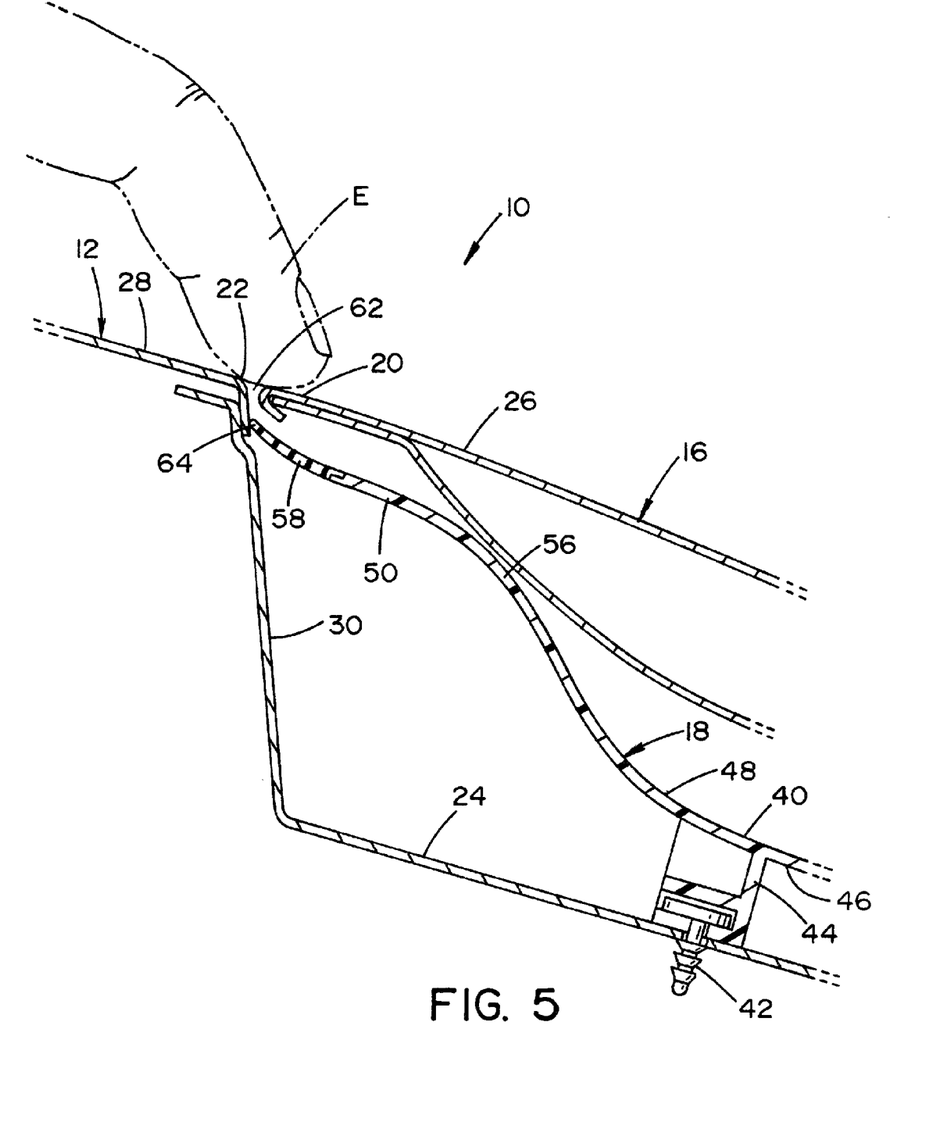
FIG. 5 is a cross-sectional view similar to FIGS. 3 and 4 showing the closure in its closed position.

More specifically, with additional reference to FIG. 4, the second portion 50 is sloped upward toward the show surface 28 of the vehicle body 12 to position an extremity E interposed between the hinged edge portion 20 and the sidewall 30 for removal by the closure 16 as the closure 16 is closed (as indicated by arrow 60). Accordingly, referring to FIGS. 3 and 4 together, the second portion 50 is particularly configured to facilitate forced removal of an extremity E when such extremity E is interposed between the hinged edge portion 20 and the adjacent portion 22 of the vehicle body 12, such forced removal occurring by the hinged edge portion 20 as the closure 16 is closed. Once the closure 16 is in its fully closed position as illustrated in FIG. 5, an extremity E, such as a finger, typically is too large to be received within gap 62 defined between the hinged edge portion 20 and the adjacent portion 22 of the vehicle body 12. Accordingly, the garnish member 18 facilitates removal of an extremity E from a pinch position to a safe position (FIG. 5) where the extremity is safe from pinching and the result is a no pinch condition. In contrast, with reference to FIGS. 6 and 7, when no anti-pinch garnish assembly is provided, an extremity E can potentially be received in a gap between the hinged edge portion 20 of the closure 16 and the adjacent portion 22 of the vehicle body. In this situation, closing of the closure toward or to its closed position can result in the extremity E being pinched as shown in FIG. 7.

With reference back to FIG. 1, the garnish member 18 of the illustrated embodiment is shaped and sized to fit between the opening 14 and the sidewall 30. In particular, with specific reference to FIGS. 1 and 2, a first edge portion 64 generally matches a shape of the sidewall 30, including any curvature provided therein, and a second opposite edge portion 66 generally matches a shape, including any curvature, of the opening 14. The illustrated pinch garnish 18 can also include a stepped portion 68 allowing for the garnish member 18 to be cooperatively received adjacent another vehicle component, such as another garnish member (not shown).

In the illustrated embodiment, the recessed area 24 is a gutter surrounding a rear opening of the vehicle body 12 and the first portion 40 is secured to the gutter 24 in close proximity thereto. The second portion 50 is elevated relative to the first portion 40 toward the show surface 28 of the vehicle body 12 that surrounds the gutter 24. In this arrangement, the garnish member 18 includes a cut out portion 70 for accommodating strut member 72 which facilitates opening and closing of the closure 16. An additional feature of the garnish member 18 of the illustrated embodiment is the inclusion by the second portion 50 of a first laterally inward section 76 that mates with or cooperates with a main portion of the closure and a second laterally outward section 78 that has a curvature matching a curvature of a lateral edge portion 80 of the closure 16. By this arrangement, should an extremity E be positioned between the sidewall 30 and an end edge 82 of the closure lateral edge portion 80, the pinch garnish 18 will still function to urge the extremity E away from a pinch condition as the closure 16 is moved to or toward its closed position.

While the rear opening 14 of the illustrated embodiment is a rear tailgate type opening, it is to be appreciated that the anti-pinch garnish can be used with other openings (e.g., a trunk opening) and can be modified to fit and/or cooperate with other openings. Likewise, the illustrated closure 16 is shown as a rear tailgate, though it is to be appreciated that the closure 16 could be some other type of closure (e.g., a trunk lid) and the anti-pinch garnish can be modified to fit and/or cooperate with these other types of closures.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An anti-extremity pinch garnish for preventing pinching of extremities between a hinged edge portion of a vehicle closure and an adjacent portion of a vehicle body to which the vehicle closure is pivotally mounted, the closure selectively closing an opening defined in the vehicle body, said anti-extremity pinch garnish comprising:
   a first portion secured to the vehicle body adjacent the opening defined therein;
   a second portion integral with said first portion and configured to obstruct entry of an extremity between the hinged edge portion of the closure and the adjacent portion of the vehicle body, wherein said first portion is received in a recessed area of the vehicle body surrounding the opening and accommodating the closure when in a closed position and said second portion is raised relative to said first portion and the recessed area.

2. The anti-extremity pinch garnish of claim 1 further including:
   an inner portion formed of a first material; and
   a second peripheral edge portion formed of a second material, said first material more rigid than said second material.

3. The anti-extremity pinch garnish of claim 2 wherein said second material is a flexible resilient material adapted to be moved by the closure when moved toward a closed position to avoid being pinched between the closure and the vehicle body.

4. The anti-extremity pinch garnish of claim 1 wherein said second portion bridges between the hinged edge portion of the closure and a show surface of the vehicle body that is generally coplanar with the closure when in the closed position.

5. The anti-extremity pinch garnish of claim 1 wherein said recessed area is a gutter surrounding a rear opening of the vehicle body and said first portion is secured to said gutter in close proximity thereto and said second portion is elevated relative to said first portion toward a show surface of the vehicle body surrounding said gutter.

6. An anti-extremity pinch garnish for preventing pinching of extremities between a hinged edge portion of a vehicle closure and an adjacent portion of a vehicle body to which the vehicle closure is pivotally mounted, the closure selectively closing an opening defined in the vehicle body, said anti-extremity pinch garnish comprising:
   a first portion secured to the vehicle body adjacent the opening defined therein;
   a second portion integral with said first portion and configured to obstruct entry of an extremity between the hinged edge portion of the closure and the adjacent portion of the vehicle body, wherein said second portion includes a first laterally inward section and a second laterally outward section having a positive curvature matching a curvature of a lateral edge portion of the closure.

7. The anti-extremity pinch garnish of claim 1 further including a fastener structure depending from an underside of said first portion for accommodating a fastener that secures said first portion to the vehicle body without being viewable on a show surface of said first portion.

8. The anti-extremity pinch garnish of 1 wherein said second portion includes an outer peripheral edge portion formed of a flexible material for mating with a sidewall of the vehicle body extending from a show surface of the vehicle body.

9. The anti-extremity pinch garnish of claim 8 wherein outer peripheral edge portion is sloped upward toward the show surface to guide away an extremity interposed between the hinged edge portion and the sidewall as the closure is closed.

10. The anti-extremity pinch garnish of claim 1 wherein the second portion is sloped upward toward a show surface of the vehicle body to position an extremity interposed between the hinged edge portion and the sidewall for removal by the closure as the closure is closed.

11. The anti-extremity pinch garnish of claim 1 wherein said second portion is further configured to facilitate forced removal of an extremity, when interposed between the hinged edge portion and the adjacent portion of the vehicle body, by the hinged edge portion as the closure is closed.

12. A vehicle closure assembly for preventing pinching of extremities, comprising:
   a vehicle body defining an opening therein, wherein said vehicle body includes a recessed area defined around said opening;
   a closure hingedly connected to said vehicle body for selectively closing said opening; and
   a garnish member secured to said vehicle body to limit insertion of an extremity between a hinged edge of said closure and an adjacent portion of said vehicle body, wherein said garnish member is secured to said recessed area and includes an inner rigid portion and an outer less rigid portion.

13. The vehicle closure assembly of claim 12 wherein said vehicle body includes:
   a sidewall extending upwardly from said recessed area; and
   a show surface offset relative to said recessed area and connected thereto by said sidewall.

14. The vehicle closure assembly of claim 13 wherein said garnish member includes a first portion mounted against or adjacent said recessed area and a second portion sloped upwardly from said first portion toward said show surface.

15. The vehicle closure assembly of claim 13 wherein said garnish member is shaped and sized to fit between said opening and said sidewall.

16. A vehicle closure assembly for preventing pinching of extremities, comprising:
   a vehicle body defining an opening therein, wherein said vehicle body includes a recessed area defined around said opening, a sidewall extending upwardly from said recessed area, and a show surface offset relative to said recessed area and connected thereto by said sidewall;
   a closure hingedly connected to said vehicle body for selectively closing said opening;
   a garnish member secured to said recessed area of said vehicle body to limit insertion of an extremity between a hinged edge of said closure and an adjacent portion of said vehicle body, wherein said garnish member is shaped and sized to fit between said opening and said sidewall, and
   wherein said garnish member includes a first edge portion generally matching a shape of said sidewall and a second, opposite edge portion generally matching a shape of said opening.

17. The vehicle closure assembly of claim 13 wherein said recessed area includes a seal mounted around said opening and sealing against said closure when in a closed position.

18. An anti-pinch garnish assembly for a vehicle, comprising:
   a garnish member having a first portion fastened to a recessed area of a vehicle body, said recessed area defining an opening and accommodating a closure that is hingedly mounted to said vehicle body and capable of closing said opening when in a closed position, said closure received in said recessed area so as to be flushly positioned relative to a show surface of said vehicle body when in the closed position, said garnish member having a second portion integrally formed with said first portion and extending therefrom so as to obstruct insertion of an extremity between a hinged edge portion of said closure and said show surface of said vehicle body.

* * * * *